June 3, 1947.　　　P. J. HEROLD　　　2,421,455
HAND MOTOR
Filed Aug. 26, 1944　　　2 Sheets-Sheet 1
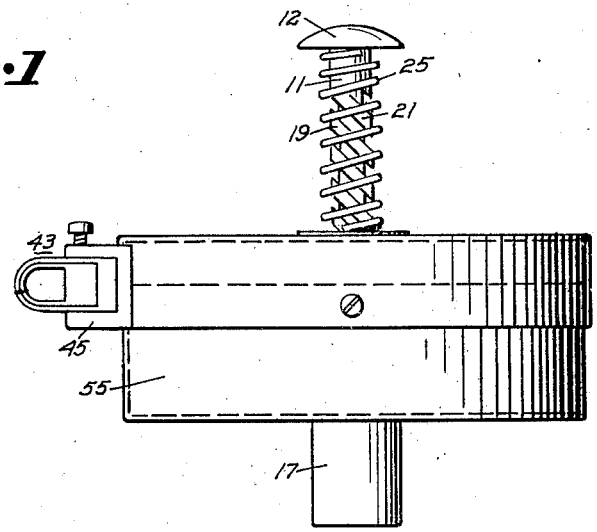
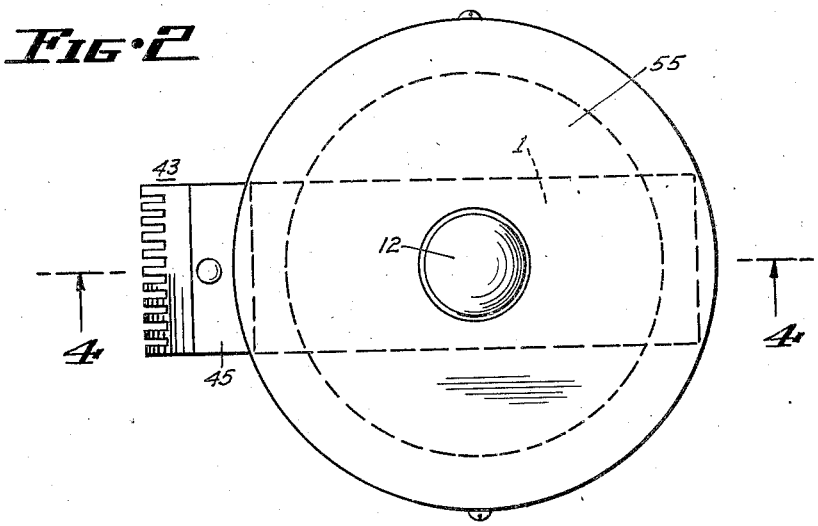
INVENTOR.
PETE J. HEROLD.
BY
Lippincott & Metcalf
ATTORNEYS.

June 3, 1947.  P. J. HEROLD  2,421,455
HAND MOTOR
Filed Aug. 26, 1944  2 Sheets-Sheet 2

INVENTOR.
PETE J. HEROLD
BY
Lippincott & Metcalf
ATTORNEYS.

Patented June 3, 1947

2,421,455

UNITED STATES PATENT OFFICE 2,421,455

HAND MOTOR

Pete J. Herold, San Francisco, Calif.

Application August 26, 1944, Serial No. 551,385

5 Claims. (Cl. 74—127)

My invention relates to motors, and more particularly to hand motors.

Among the objects of my invention are:

(1) To provide a novel and improved hand operated hand motor capable of operating small tools, toys, or the like;

(2) To provide a novel and improved hand motor of relatively light weight and rugged construction.

Additional objects of my invention will be brought out in the following description of a preferred embodiment of the same taken in conjunction with the accompanying drawings wherein—

Figure 1 is a side elevational view of my improved motor enclosed in a casing;

Figure 2 is a plan view of the motor of Figure 1;

Figure 3:
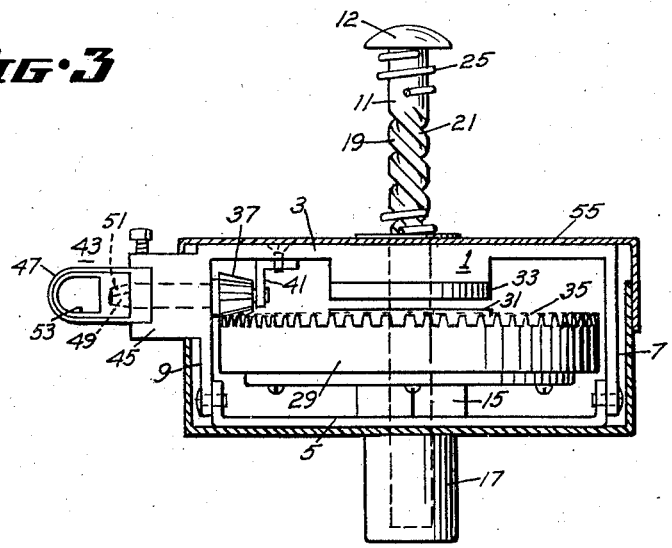
Figure 3 is a side elevational view of the motor of Figure 1, with the casing shown in section to expose the interior elements of the motor.
Figure 4:
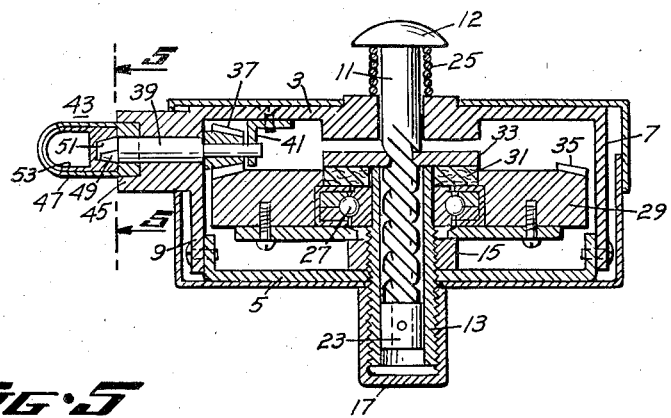
Figure 4 is a view in section, taken in the plane 4—4 of Figure 2.
Figure 5:
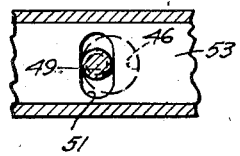
Figure 5 is a view in section, taken in the plane 5—5 of Figure 4.

With reference to the drawings, the motor is built into a frame 1 of substantially rectangular form, having spaced sides 3, 5 and ends 7, 9. A hand operable plunger 11 having a knob 12, is slidably supported through the spaced sides, the interior end of the plunger being preferably guided in a bushing 13 which is threadedly mounted in one side 5 and locked in position to the side by an interior nut 15 and an external cap nut 17 threaded over the exposed end of the bushing.

The plunger is preferably formed with a pair of square threads 19 and 21, and terminates in a collar bearing 23 having a sliding fit in the bushing. A spring 25 about the exposed end of the plunger functions to bias the plunger to an extended position, as depicted in Figures 1 and 3.

Disposed about the bushing 13 and preferably press fitted thereon, is a ball race 27, the outer section of which is mounted in and carries a metal flywheel 29 supported axially of the plunger. This flywheel has a central insert 31 of disc shape, preferably of leather or the like, which extends slightly above the surface of the flywheel and constitutes one element of a clutch, the other element of which is a metal disc 33 preferably of metal, threadedly mounted on the plunger. The double thread on the plunger provides diametrical support to the disc 33 and thereby holds the same in a plane parallel to the other disc element 31 of the clutch.

Rotational movement is imparted to the flywheel 29 by depressing the plunger 11 one or more times in rapid succession, the amount of energy imparted to the flywheel being a function of the speed of actuation of the plunger and the rapidity with which succeeding strokes follow. During the depression strokes of the plunger, power is transmitted to the flywheel via the clutch elements 31 and 33. The movement of the threaded plunger 11 during a depression stroke, will, at the start, carry the metal disc 33 into engagement with the leather disc element of the flywheel, following which, the further movement of the plunger will produce rotation of the metal disc. Such rotational movement is transmitted to the flywheel. So long as the movement of the plunger results in driving of the metal disc, a driving engagement of the clutch elements will continue, and power will be transmitted to the flywheel. As soon, however, as the flywheel tends to drive the metal disc, a condition which will occur when the plunger slows down sufficiently or comes to rest, as at the end of its power stroke, the metal disc element of the clutch will tend to ride up the threads of the plunger, and immediate separation of the clutch elements will occur and continued rotation of the flywheel free of any frictional engagement with the clutch disc 33, will follow. Thus the clutch is highly efficient, entirely automatic in operation, and structurally, is of the utmost simplicity.

The energy of the spinning flywheel is adapted for utilization in the operation of small tools, toys, or the like. For this purpose, the flywheel is provided with peripheral gear teeth 35 in engagement with a pinion 37 fixed to a shaft 39 extending through the front end 9 of the frame, the interior end of the shaft being journaled in a bracket 41 affixed to one of the sides of the frame, thus giving very substantial bearing support to the shaft.

By adjusting the bushing 13 in the side 5 of the frame, prior to locking the bushing in position, the flywheel can be shifted into closer or looser engagement with the pinion, whereby the most efficient working condition can be realized.

In the specific embodiments of my invention, as illustrated in the drawings, the shaft 39 is employed to drive a cutter head 43 of the type associated with electric shaving devices. The cutter head is fixed in a groove in an extension 45 on the front end of the motor frame. The shaft extends through a hole 46 in the base of the outer element 47 of the cutter head and terminates in an eccentric 49 which rides in a vertical slot 51 provided in the base of the inner slidable cutter 53 of the cutter head, whereby upon rotational movement of the shaft, the inner slidable cutter will be rapidly oscillated within the outer element of the cutter head, causing two strokes per revolution of the shaft.

By providing a bevel about the slot 51 and preferably a complementary bevel on the eccentric, a slight thrust force will develop tending to force the inner cutter outwardly into close operating engagement with the outer cutter, thereby enhancing the cutting effect of the elements.

For convenience and appearance, the motor frame and interior elements may be enclosed within a casing 55 which may be of the telescopic type, enabling the same to be conveniently removed to provide access to the interior of the motor.

While I have disclosed a preferred form of my invention, the same, of course, is subject to alteration and modification without departing from the underlying principles thereof, and I accordingly do not desire to be limited in my protection to the specific details disclosed and described, except as may be necessitated by the appended claims.

I claim:

1. A hand motor comprising a frame of a size to fit the hand and having spaced sides, a threaded plunger slidably mounted in said frame, a spring normally biasing said plunger to an extended position, a flywheel supported axially of said plunger for independent rotation with respect thereto and including a centrally mounted clutch element, and a clutch disc threaded on said plunger adjacent said flywheel and adapted to engage said clutch element and spin said flywheel during depression of said plunger.

2. A hand motor comprising a frame of a size to fit the hand and having spaced sides, a bushing extending through one side and affixed therein, a threaded plunger slidably mounted through said other side and in said bushing, spring means normally biasing said plunger to an extended position, a flywheel supported axially of said plunger for independent rotation with respect thereto and having a clutch element mounted thereon, and a clutch disc threaded on said plunger adjacent said flywheel and adapted to engage said clutch element and spin said flywheel during depression of said plunger, and tool means operatively connected to said flywheel.

3. A hand motor comprising a frame of a size to fit the hand and having spaced sides, a threaded plunger slidably mounted through said sides, a spring normally biasing said plunger to an extended position, a flywheel supported axially of said plunger for independent rotation with respect thereto, and a clutch disc threaded on said plunger adjacent said flywheel and adapted to engage said flywheel and spin the same during depression of said plunger.

4. A hand motor comprising a frame of a size to fit the hand, a plunger slidably mounted in said frame and formed with a plurality of threads, spring means normally biasing said plunger to an extended position, a flywheel supported axially of said plunger for independent rotation with respect thereto, and a clutch disc threaded on said plunger adjacent said flywheel and adapted to engage said flywheel and spin the same during depression of said plunger.

5. A hand motor comprising a frame of a size to fit the hand and having spaced sides, a threaded plunger slidably mounted through said sides, a spring normally biasing said plunger to an extended position, a flywheel supported axially of said plunger for independent rotation with respect thereto, a clutch disc threaded on said plunger adjacent said flywheel and adapted to engage said flywheel and spin the same during depression of said plunger, and means for utilizing the energy of said flywheel, said last means including a shaft geared to said flywheel and extending beyond said frame for connection to a suitable tool.

PETE J. HEROLD.

REFERENCES CITED

The following references are of record in the file of this patent:

UNITED STATES PATENTS

| Number | Name | Date |
|---|---|---|
| 2,104,929 | Kendall | Jan. 11, 1938 |
| 1,970,518 | Aaron | Aug. 14, 1934 |
| 771,864 | Eager | Oct. 11, 1904 |
| 1,239,055 | Sparks | Sept. 4, 1917 |
| 1,213,733 | Braunbeck | Jan. 23, 1917 |
| 848,703 | Taylor | Apr. 2, 1907 |
| 833,272 | Weymar | Oct. 16, 1906 |
| 1,612,524 | Monohon | Dec. 28, 1926 |